W. T. HANLY & T. W REESE.
TANK SUPPLY AND FLUSHING APPARATUS.
APPLICATION FILED OCT. 21, 1916.

1,234,898.

Patented July 31, 1917.
3 SHEETS—SHEET 1.

Inventors
Will T. Hanly.
Thomas W. Reese
By Lancaster and Allwine
Their Attorneys

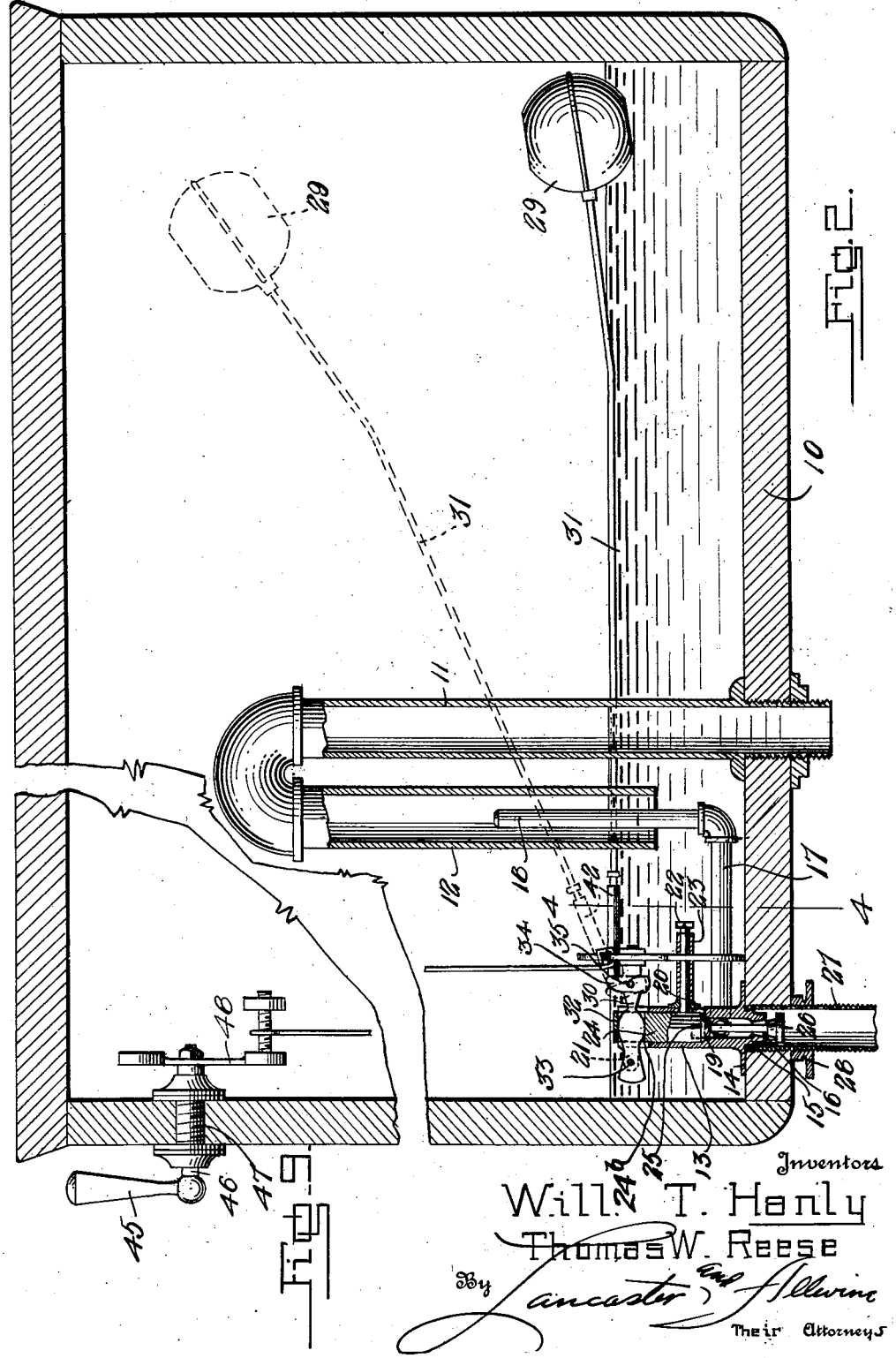

W. T. HANLY & T. W REESE.
TANK SUPPLY AND FLUSHING APPARATUS.
APPLICATION FILED OCT. 21, 1916.
1,234,898.
Patented July 31, 1917.
3 SHEETS—SHEET 3.
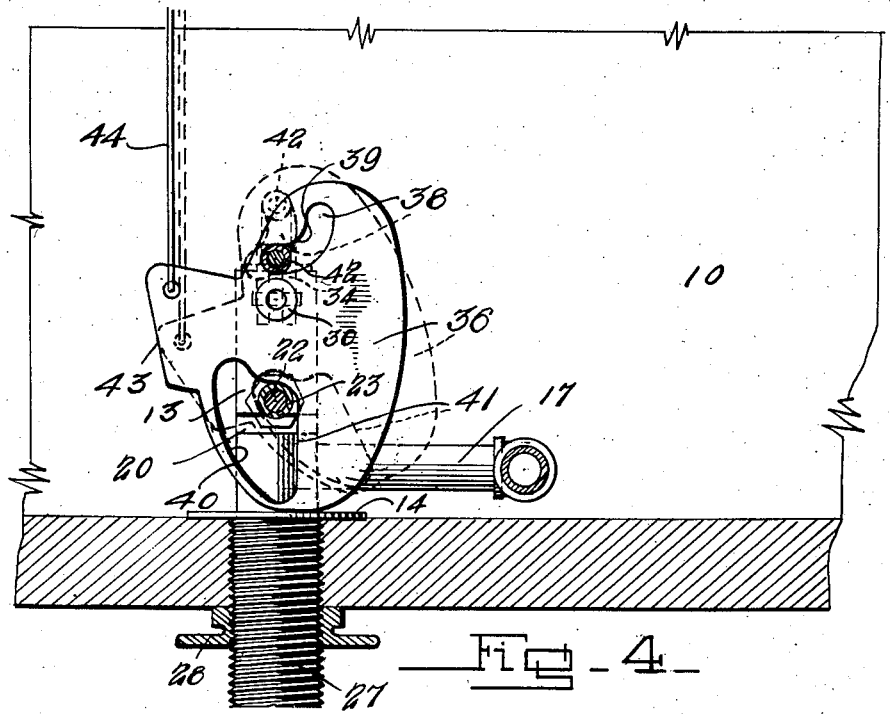
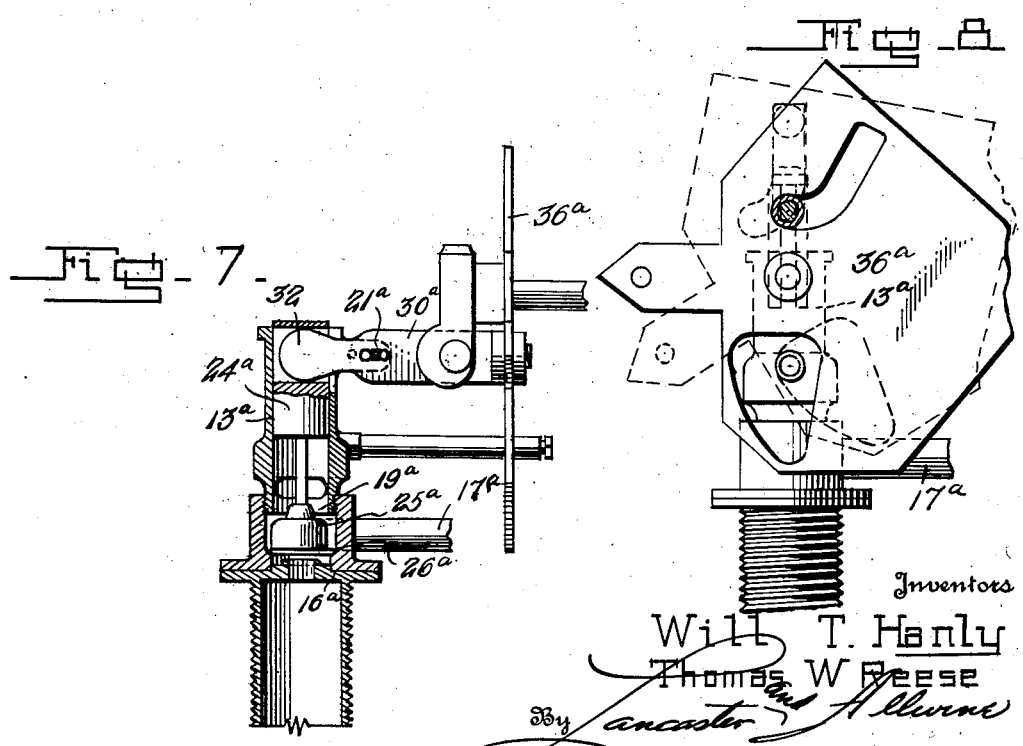

UNITED STATES PATENT OFFICE.

WILL T. HANLY AND THOMAS W. REESE, OF MOBILE, ALABAMA.

TANK-SUPPLY AND FLUSHING APPARATUS.

1,234,898.          Specification of Letters Patent.          Patented July 31, 1917.

Application filed October 21, 1916. Serial No. 126,922.

*To all whom it may concern:*

Be it known that we, WILL T. HANLY and THOMAS W. REESE, citizens of the United States, and residents of Mobile, in the county of Mobile and State of Alabama, have invented a certain new and useful Improvement in Tank-Supply and Flushing Apparatus, of which the following is a specification.

The present invention relates to an apparatus for automatically controlling the supply of water to a flushing tank, and for automatically controlling the siphoning of the water from the tank for flushing purposes.

The present invention has for an object to provide a float-controlled supply valve adapted to be closed by the float when a predetermined surface level of water is reached in the tank, and to provide a novel connection between the float and the valve for releasing the latter from the float, and for opening the valve while the float is in its raised position, and to provide a siphon jet under relatively great pressure for effecting the substantially instantaneous siphoning or flushing of the water from the tank.

Another object of the present invention is to provide a construction of supply valve wherein after the tank has been substantially drained of the water therein, the siphon jet is automatically reduced in pressure after providing a refill for the bowl, or the like, which may be connected to the tank, and wherein water from the supply pipe is admitted to the tank for the purpose of filling the same.

The invention has for a further object the provision of an apparatus of this character wherein the siphon tube may be made continuous and unbroken, and wherein all such devices as rubber flush bulbs, siphon rings, and other mechanical parts usually employed, are eliminated.

The present invention still further aims at the provision of an apparatus of this character which comprises but relatively few parts which may be economically and easily manufactured; an apparatus wherein the flushing is more silent than in the ordinary flushing apparatus now in use; an apparatus the parts of which are strong and durable, and which cannot easily leak; and an apparatus which may be provided with valves working with or against the pressure in the supply pipe.

The above, and various other objects and advantages of this invention will be brought out more clearly in the following detailed description of the present preferred embodiment of this invention, the same being illustrated in the accompanying drawings wherein:

Fig. 2 is an enlarged view of the same, the apparatus being shown in section, and the supply valve being shown in open position.

Fig. 4 is a fragmentary enlarged sectional view taken on the line 4—4 of Fig. 2, showing other hereinafter described positions of said combined latch and cam plates.

Fig. 7 is a detail vertical sectional view taken through the supply valves, showing a modification in the structure thereof.

Fig. 8 is a side elevation of the same, showing the combined latch and cam plate adjusted in the position of Fig. 7.

Fig. 9 is a fragmentary sectional view of the upper end of the tank, showing the operating handle mounted therein.

Figure 1:
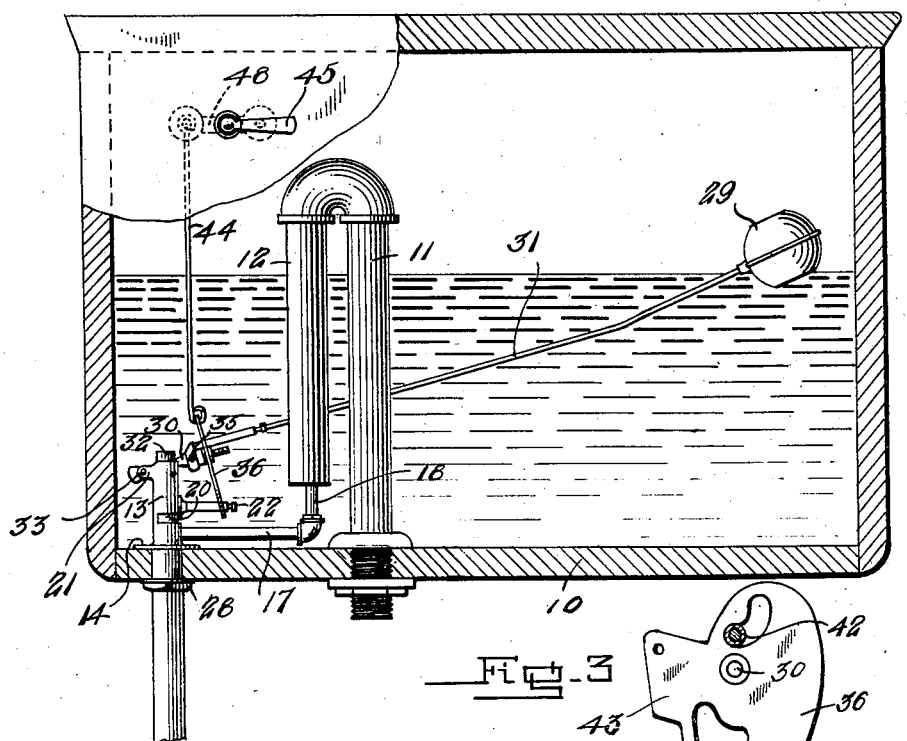
Figure 1 is a vertical sectional view through a flushing tank, having a tank supply and flushing apparatus constructed according to the present invention applied thereto, the apparatus being shown in elevation.

Referring to these drawings, wherein like parts are designated by similar numerals of reference throughout the several views, 10 designates a supply tank of any suitable size and construction. A siphon tube 11 is suitably mounted in the tank 10 and is provided with a short leg 12 opening downwardly in the usual manner and adapted to be sealed by the water in the tank.

The tank 10 is provided, preferably near one end, with a supply valve in the form of a riser 13 having a base flange 14 adapted to seat upon the bottom of the tank 10, and provided with a depending externally threaded projection 15 formed with a downwardly facing valve seat 16 upon its lower end. The riser 13 is provided, at a point above the valve seat, with a lateral opening, from which leads a jet pipe 17, the pipe terminating at its outer end in an upwardly extending nozzle 18 projecting up into the short leg 12 of the siphon to a considerable extent. Above the jet pipe 17, the riser 13 is provided with an upwardly facing valve seat 19 which leads to lateral openings 20 formed in the opposite sides of the riser 13 for communication with the interior of the tank 10. The upper end of the riser 13 is forked, and is provided with a pair of opposed ears 21 carried upon the opposite fork arm which have registering apertures therein. A fixed stem 22 projects laterally from the riser 13 in the vertical plane of the ears 21 and is provided with a relatively long roller 23 for a purpose which will hereinafter appear.

A plunger 24 is fitted snugly in the upper end of the riser 13 and is adapted to slide vertically therein. The upper end of the plunger 24 is provided with a transverse slot, 24$^b$, and the lower end of the plunger is provided with an upper valve head 25, and a lower valve head 26. The valve head 25 may be detachably secured to the upper enlarged portion of the plunger 24, and the lower valve head 26 may be detachably secured to the lower end of the lower section of the plunger 24. To permit assembly of the parts the lower end of the plunger may be in the form of a stem adapted to be detachably secured to the lower end of the larger upper part of the plunger. The valve head 25 is adapted to seat on the upwardly facing valve seat 19, and the head 26 is adapted to engage the downwardly facing valve seat 16, the heads 25 and 26 being so spaced apart as to alternately engage their respective valve seats. The riser 13 is held in the tank 10 by means of a detachable tail piece 27 which is secured in threaded relation over the depending projection 15 of the riser, and which is provided with a clamping nut 28 in the usual manner for binding the riser in water-tight relation upon the bottom of the tank.

A float 29 is connected to the plunger 24 by a preferably two-part stem comprising a plunger part 30 and a float part 31. The plunger part 30 is provided with a flat cam head 32 fitting in the transverse slot in the top of the plunger 24, and has a pivot lug at one side of the cam head, the lug being adjustably engaged by a pivot pin 33 carried in the ears 21. The ears 21 project from the riser 13 at one side opposite to that from which the stem 22 projects, and when the outer end of the plunger part 30 is raised, the plunger 24 is raised therewith. The float part 31 of the stem is forked at its inner end, as at 34, and is pivotally secured over the plunger part 30 by means of a pin 35. The float 29 with its stem part 30 is free to rise and fall in the tank without operating the plunger part 31, or disturbing any adjusted position of the plunger.

Figure 3:
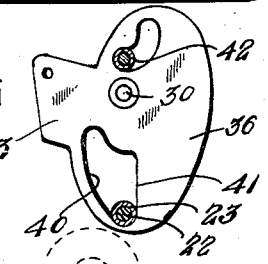
Fig. 3 is a face view of the combined latch and cam plate shown in the position of Fig. 1, embodying one of the features of this invention.
Figure 5:
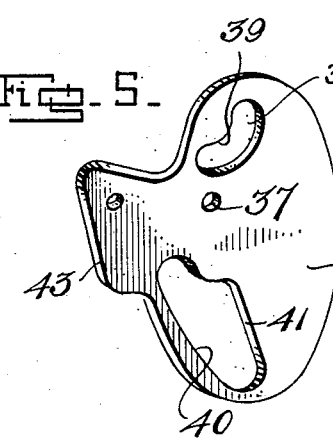
Fig. 5 is a detail perspective view of the combined latch and cam plates.
Figure 6:
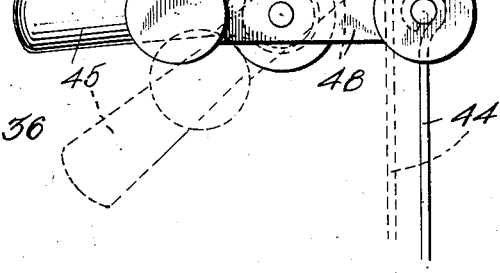
Fig. 6 is a detail enlarged inner side elevation of the operating handle and the connection carried thereby.

Mounted to freely turn upon the outer end of the stem plunger part 30 is a combined latch and cam plate 36. As shown in Figs. 3, 4 and 5, this plate is substantially of oval form and has an axial opening 37 adjacent to one end thereof. The stem part 30 pivotally engages through the opening 37 and the elongated end of the plate 36 is adapted to normally hang down by its own weight. The upper short end of the plate 36 is provided with an arcuate slot 38 having its center of curvature above the axial opening 37, and substantially in the vertical plane thereof when the plate 36 is in normal position. The slot 38 therefore provides at its lower end a downwardly facing shoulder 39. The float part 31 of the stem is adapted to pass through this arcuate slot 38, and to be latched beneath this shoulder 39 to hold the stem 31 in substantially longitudinal alinement with the plunger part 30 of the stem, and to thus lock the two parts of the stem together so that the float 29 may operate the plunger 24. The lower end of the plate 36 is provided, toward one lateral edge thereof oppositely to the direction in which the arcuate slot 38 extends, with an elongated opening provided with an outer arcuate wall forming a cam face 40, and having an opposite wall 41 at its inner side substantially coincident with the major axis of the plate 36. The lower end of this slot extends to a point near the lower edge of the plate, and the upper end of the slot terminates in an arcuate wall struck upon the central axis of rotation of the plate. The fixed stem 22 and its sleeve 23 are adapted to project through this lower slot, the sleeve working against the opposite walls thereof during the operation of the plate. The float part 31 of the stem is provided with a sleeve 42 which projects through the slot 38 and is adapted to contact with the opposite walls thereof to reduce frictional contact between the plate and the parts of the valve and permit of the easy operation thereof.

The plate 36 is provided at one side, above the lower slot, with a lug 43 having an opening 43$^a$ in its outer end through which is hinged the lower end of a connecting rod 44 located within the tank 10 in and adjacent to one wall thereof. Said wall of the tank is provided, near the top of the tank, with a handle 45 arranged outside of the tank and provided with a stem 46 mounted to turn in a bushing 47 which is secured through the wall of the tank, the stem 46 having upon its inner end a weighted arm 48 adapted for pivotal engagement at one end with the upper extremity of said rod 44. The weighted lever 48 is adapted to urge the handle 45 into any predetermined normal position, such as shown in Fig. 9, wherein the handle 45 extends upwardly and vertically. The plate or operating member 36 may be given any suitable form, and provided with upper and lower slots and cam faces disposed in any suitable manner to interlock and release the stem sections 30 and 31 in accordance with the hereinafter described operation.

In operation, when the tank 10 is substantially empty, the float 29 drops into the lower end thereof and swings the float part 31 of the stem down in the position shown in full lines in Fig. 2. As soon as the stem part 31 reaches this position, the plate 36 is permitted to swing by its own weight into the full line position shown in Fig. 4. The shoulder 39 engages the top of the stem 31 and prevents the same from rising except by carrying the plate 36 and the plunger part 30 of the stem therewith. The plunger 34 is depressed when the parts are in this position, and the lower valve 26 is open to admit water from the supply pipe upwardly through the tail piece 27 into the riser 13. The upper valve 25 of the plunger is seated on the valve seat 19 and chokes off the upward flow of the water through the riser, although permitting a relatively small amount of the water to pass upwardly and out of the lateral openings 20 into the tank. As the seal has been broken at the lower end of the short leg of the siphon, the water passing into the riser and through the jet pipe 17 is directed upwardly through the short leg 12 and for the most part falls back into the tank 10, assisting to fill the same. As the water rises in the tank 10, the float 29 is carried therewith, and the two parts of the stem, which are now interlocked, are raised so as to gradually raise the plunger 24. As the plunger 24 is lifted, the upper valve head 25 is gradually unseated from the valve seat 19 and a greater flow of the supply water is permitted to pass outwardly through the opening 20 into the tank. In this manner, the flow of the supply water into the tank is increased, and the flow of the water through the jet passage 17 is decreased.

When the water reaches a predetermined surface level, as shown in Fig. 1, the plunger 24 is raised to its fullest extent, and the lower valve head 26 is seated upon the valve seat 16. The supply pipe is now closed, and the combined latch and cam plate 36 is in raised position as shown to advantage in Fig. 3. When it is desired to flush the bowl, or other device connected to the tank 10, it is only necessary to turn the handle 45 and depress the connecting rod 44. This operation swings the plate 36 around its pivotal support, the outer end of the plunger part 30 of the stem, and moves the shoulder 39 out of engagement with the float part 31 of the stem. At the same time, the cam face 40 is drawn across the lower side of the roller 23 and the plate 36 draws the plunger part 30 of the stem downwardly to depress the plunger 24. This operation is effected by a relatively slight movement of the plate 36, and the plunger 24 is moved down quickly so as to admit the water under pressure into the lower end of the riser 13 and outwardly past the valve seat 16 into the jet pipe 17. The supply water issues at substantially full pressure from the nozzle 18 into the short leg 12 of the siphon, and over the bend of the siphon so as to provide a sealed column of water in the long leg of the siphon and thus start the siphoning of the water from the tank. It may be here noted that this siphoning action is started merely by the changed position of the plunger, and that no valves, bulbs or other devices are required.

In Fig. 4, the dotted line discloses the position of the plate 36 immediately subsequent to the operation of the handle 45. When the handle is released the plate 36 gradually swings into its normal position, shown in full lines in Fig. 4, as the float 29 and its stem part 31 drop in the tank. As before explained, when the stem part 31 reaches its lowermost position the plate 36 automatically swings, by its own weight, into position to bring the shoulder 39 of the plate over the stem part 31 and thus automatically latch the two parts of the stem together.

The valve head 25 does not entirely close the upper part of the riser 13 to the supply pipe so that even when the float 29 is in the lowered position as shown in Fig. 2, a small amount of the supply water passes out of the opening 20 into the tank, and the float 29 is immediately started in an upwardly moving position. The rising of the float effects the gradual reduction in the pressure of the water in the jet pipe 17, and increases the flow of the water through the outlet opening 20.

It will be noted that when the valve 26 has been closed, after the desired surface level of the water has been reached in the tank 10, the same valve 26 is opened to admit a jet of water into the siphon to immediately start the siphoning action of the water from the tank, and that after the siphoning action is completed, the same valve is operated to control the jet for the refill of the bowl or the like.

In the modification disclosed in Figs. 7 and 8, the riser 13ᵃ is provided at its upper end with a slot in one side only, the riser also having spaced-apart ears 21ᵃ arranged at the opposite sides of said slot. The plunger 24ª is transversely slotted as in the preferred form, and receives therein the relatively flat cam head 32ª which is carried upon the extremity of the plunger parts 30ª of the stem. The pivot portion of the stem 30ª lies between the head 32ª and the opposite end of the stem. The lower end of the plunger 24ª is provided with a valve head having upper and lower valve-seating faces 25ª and 26ª adapted to alternately seat upon the opposed valve seats 19ª and 16ª. The riser 13ª is made in two parts, a base part, and an upper part which are connected together in threaded relation. The lower end of the upper part provides the downwardly facing valve seat 19ª, and the base part has therein the upwardly facing valve seat 16ª. When the plunger 24ª is depressed the inlet valve 26ª is closed on the seat 16ª, the valve being closed against the fluid pressure. The siphon pipe 17ª leads from one side of the base portion of the riser, between the valve seats 16ª and 19ª. The opening 20, as in the preferred form is arranged above the valve seat 19ª to communicate with the interior of the tank 10.

The plate 36ª is substantially of the same form as is disclosed in Figs. 3 and 4, and the upper and lower slots in the plate are substantially of the same form, and have the same result as above specifically outlined.

It is to be understood that the form of the invention above specifically described, and shown in the accompanying drawing, is but one embodiment, and is set forth merely to disclose the features of this invention. It is to be also understood that various changes and modifications may be made in this structure to adapt it to different types of tanks and conditions of installation, and that the various parts may be changed and modified as is found necessary in the manufacture and assemblage of the same, such modification and changes being restricted only by the scope of the following claims.

We claim:

1. In an apparatus as specified, the combination of a riser having opposed valve seats, a single plunger in the riser having opposed valve heads, said riser having a siphon jet opening between said seats and a tank opening above the seats, a float for actuating the plunger to cut off the water supply from both of said openings, and means independent of the float for depressing the plunger and shifting the valve heads to admit water under pressure to the siphon jet and to close the tank opening.

2. In an apparatus as specified, the combination of a riser having a siphon controlling opening therein and a tank opening above the siphon controlling opening, the riser also having a valve seat below both of said openings through which water is adapted to pass into the riser and having a second valve seat located between the openings through which water is adapted to pass upwardly to the tank opening, a single valve element in the riser having opposed valve heads adapted to alternately seat on said valve seats, and means for actuating the valve element to seat the upper valve head and open the lower valve head whereby water under full pressure is directed through the siphon controlling opening for starting the siphon, and to actuate the valve elements to gradually unseat the upper valve head and gradually seat the lower valve head whereby to gradually decrease the pressure of water through said siphon controlling opening and permit the passage of water upwardly through the tank opening.

3. In an apparatus as specified, the combination of a riser, a plunger mounted in the riser, a lever pivoted to the riser and engaging at one end with the plunger, a float, a stem carried by the float, a cam plate provided with openings therethrough to separately receive said stem and said lever, said opening in the cam plate for the stem carried by the float being provided with a recess in one end providing a supporting shoulder against which said float stem is adapted to engage to hold the stem interlocked with the lever, and means for actuating said cam plate for dislodging the shoulder from said float stem and permitting the independent operation of the float and said plunger.

4. In an apparatus as specified, the combination of a riser having upper and lower valve seats therein, a plunger arranged in the riser and having upper and lower valve heads, said riser having a lateral opening therethrough above said valve seats, a jet tube projecting from the riser between said valve seats, a siphon tube opening about said jet tube, a float, and a connection between said float and said plunger adapted to raise the plunger and seat the lower valve head for shutting off the water supply, said connection being adapted to be operated to release the float and depress the plunger to unseat the lower valve head and seat the upper valve head whereby water under pressure is adapted to pass through said jet pipe into the siphon and start the siphoning action, said connection being adapted to automatically interlock the float to the plunger when the float is lowered, whereby said upper valve head is adapted to be unseated to admit water under pressure to the tank upon the raising of the float.

5. In an apparatus as specified, the combination of a riser, a plunger mounted for vertical movement in the riser, a two-part stem hingedly connected together, one part of said stem having engagement with said plunger, a float mounted on the opposite end of said opposite part, a cam plate pivotally mounted on the plunger part of said stem and having a recess therein for the reception of the float part of said stem, said plate having in one end of said recess a shoulder for engagement with said stem to lock it from movement upon the plunger part of said stem, a fixed stud on said riser, said plate having a cam face adapted to engage said stud, and means for turning said plate whereby to release the stem parts and move said cam face over said stud to force said plunger downwardly in said riser.

6. In an apparatus as specified, a riser, a valve mounted in the riser, a float, a two-part stem connecting the valve to the float, and an interlocking cam plate connecting the parts of said stem together and adapted to be actuated to release the float and force the valve into open position when the float is raised.

7. In an apparatus as specified, a riser, a valve in the riser, a stem adapted to be connected to the valve, a float connected to the stem and adapted to close the valve when the float is raised, and means engaging said stem for disconnecting the same from said valve and forcing the latter downwardly into open position irrespective of the position of the float.

8. In an apparatus as specified, the combination of a riser provided with a stationary laterally extending stem, a plunger in said riser for controlling the passage of water therethrough, a stem part pivoted to the riser and having connection with said plunger for operating the same, a cam plate pivotally mounted upon the outer end of said stem and having a cam slot in the lower end thereof to receive said fixed stem therethrough, a float, a stem part carried by the float and having pivotal engagement with the stem part of said plunger, said plate being provided with a slot in its upper end and having a shoulder at one end of the slot, said float part of the stem engaging through said slot and adapted to be latched beneath said shoulder, and means for turning said plate to release said stem part from the shoulder and to draw the plunger part of said stem downwardly.

9. In an apparatus as specified, a plunger having a stem part, a float having a stem part, an interlocking member mounted on one of said stem parts and engaging the opposite stem part, said member being adapted to normally interlock said stem parts for movement as a unit, a relatively fixed member arranged in the path of said connecting member, and means for moving the connecting member for releasing the stem parts and for engagement with said fixed member whereby to force the plunger and its stem parts into the desired position independently of the float.

WILL T. HANLY.
THOMAS W. REESE.